(12) United States Patent
Xu et al.

(10) Patent No.: US 11,543,053 B2
(45) Date of Patent: Jan. 3, 2023

(54) STEM SEALS WITH TRIANGULAR RINGS

(71) Applicant: BAOYI GROUP CO., LTD., Wenzhou (CN)

(72) Inventors: Changxiang Xu, Zhejiang (CN); Xiaozhong Zhang, Zhejiang (CN)

(73) Assignee: BAOYI GROUP CO., LTD., Wenzhou (CN)

( * ) Notice: Subject to any disclaimer, the term of this patent is extended or adjusted under 35 U.S.C. 154(b) by 136 days.

(21) Appl. No.: 16/190,184

(22) Filed: Nov. 14, 2018

(65) Prior Publication Data
US 2022/0018462 A1    Jan. 20, 2022

(30) Foreign Application Priority Data

Jan. 1, 2018  (CN) .......................... 201810025823.8

(51) Int. Cl.

| F16K 41/04 | (2006.01) |
|---|---|
| F16J 15/16 | (2006.01) |
| F16K 5/06 | (2006.01) |
| F16J 15/18 | (2006.01) |
| F16J 15/24 | (2006.01) |
| F16K 41/02 | (2006.01) |
| F16J 15/20 | (2006.01) |

(Continued)

(52) U.S. Cl.
CPC .......... *F16K 41/046* (2013.01); *F16J 15/166* (2013.01); *F16J 15/186* (2013.01); *F16J 15/20* (2013.01); *F16J 15/24* (2013.01); *F16K 5/0689* (2013.01); *F16K 5/0694* (2013.01); *F16K 41/026* (2013.01); *F16K 41/06* (2013.01); *F16J 15/3284* (2013.01)

(58) Field of Classification Search
CPC .... F16K 41/046; F16K 5/0694; F16K 41/026; F16K 5/0689; F16K 41/06; F16J 15/166; F16J 15/3284; F16J 15/186; F16J 15/24; F16J 15/20
USPC ......................................................... 251/214
See application file for complete search history.

(56) References Cited

U.S. PATENT DOCUMENTS 2,715,412 A * 8/1955 Clade .................... F16K 41/046
                                                            137/246.17
2,963,263 A * 12/1960 Sanctuary ............. F16K 5/0631
                                                            251/315.13

(Continued)

*Primary Examiner* — John Bastianelli
(74) *Attorney, Agent, or Firm* — Leong C. Lei

(57) ABSTRACT

A pressure-tight stem cylinder seal and a self-energizing stem shoulder seal matching the stem cylinder seal that both use an equilaterally triangular soft ring as their sealing element, wherein their designing rules are first, by means of wedging function of a hard gland coaxial with the stem cylinder, to convert their original axial tightening force 2f respectively into a radial compression force $4f/\sqrt{3}$ of their soft ring 04 on the stem 02 cylinder and another radial compression force 2f of their soft ring 06 on the stem 02 shoulder and ensure that the two soft rings are so compressed from a great room to a small room as to be able to pass a pressure or stress exactly to each different direction, then to cut off their off-stem corners to give their cavities an opening or give each soft ring an axial compressing allowance, and last, by means of anti-extrusion metallic C-rings without axial resistance, to close each opening to provide a full support for the sealing deformation of their soft rings compressed in their cavities.

5 Claims, 5 Drawing Sheets

(51) Int. Cl.
*F16K 41/06* (2006.01)
*F16J 15/3284* (2016.01)

(56) References Cited

U.S. PATENT DOCUMENTS 8,439,330 B2 * 5/2013 Xu ................. F16K 41/046
277/502
8,864,105 B2 * 10/2014 Xu ................. F16K 5/204
277/529

* cited by examiner

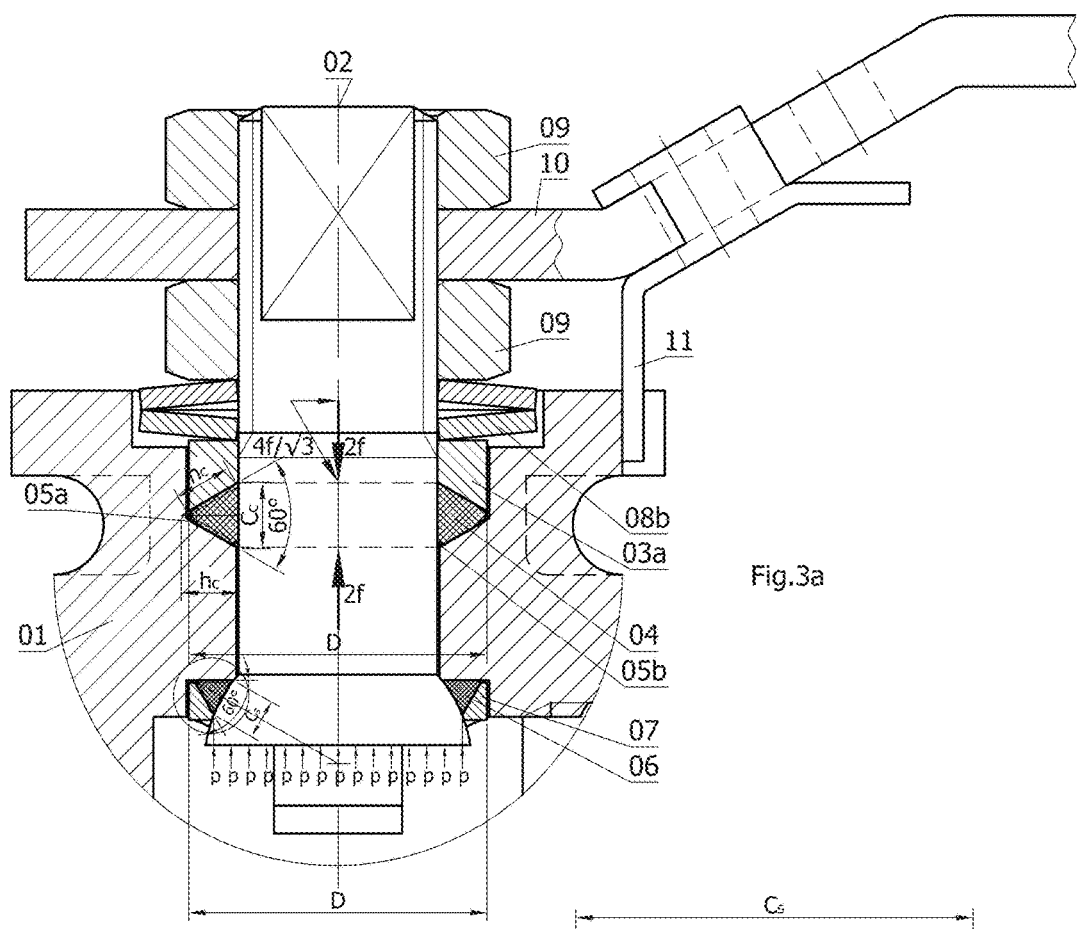
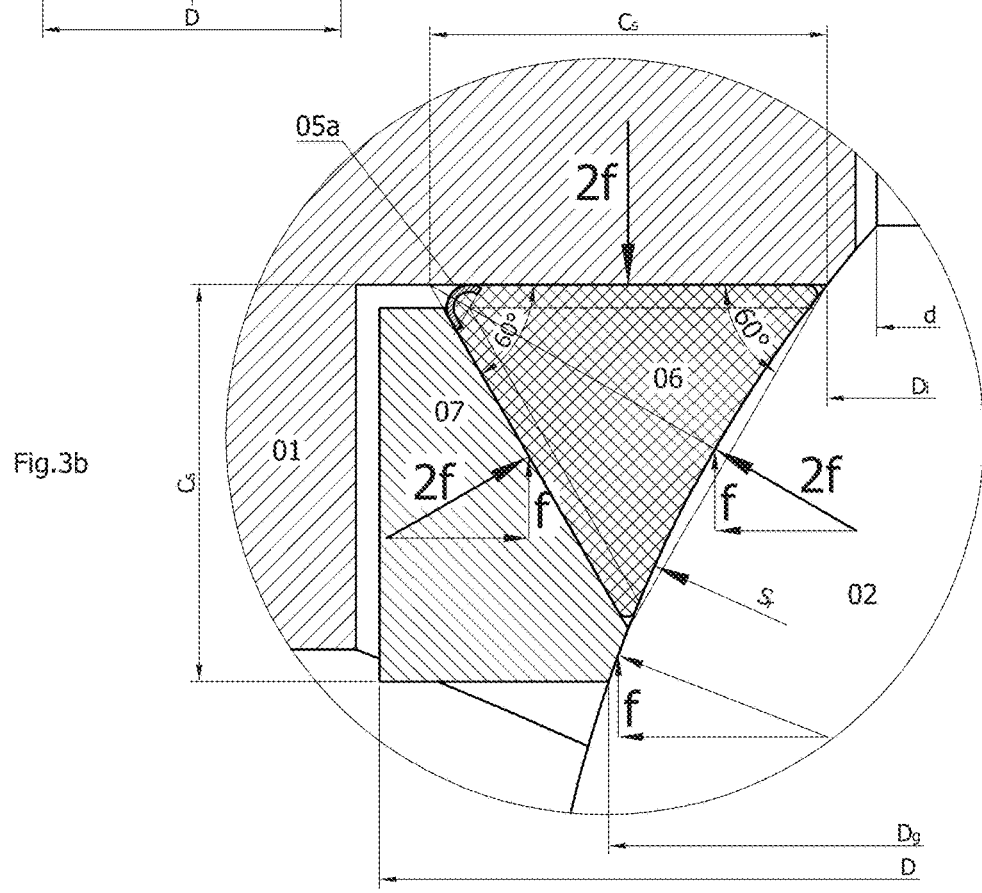
Fig.3a
Fig.3b

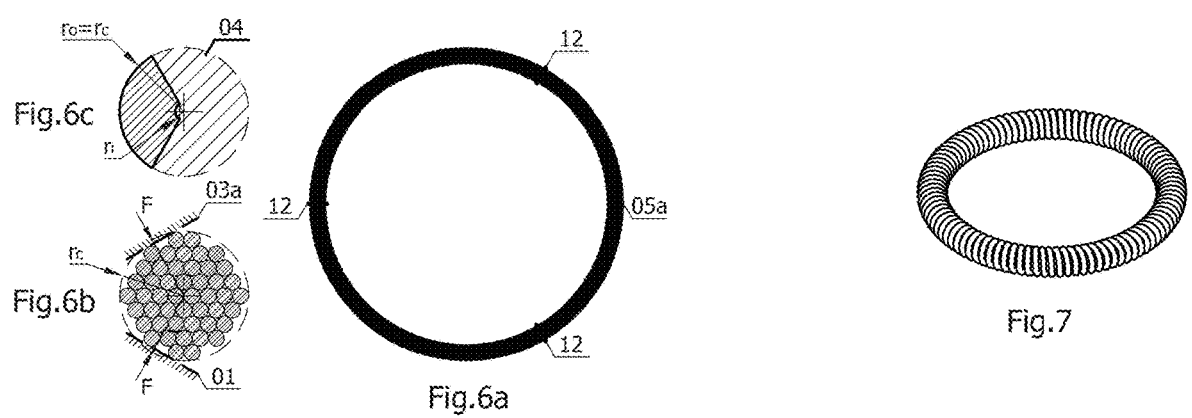

STEM SEALS WITH TRIANGULAR RINGS

TECHNICAL FIELD OF THE INVENTION

The invention belongs to the technical field of fluid power transmitting systems and fluid medium conveying systems, relating to seals between a moving rod or shaft and its housing, more particularly to equilaterally triangular ring seals between a moving rod or shaft and its housing called a valve body, a bonnet, a hydraulic cylinder or head etc.

TECHNICAL BACKGROUND OF THE INVENTION

Fluid power transmitting systems need a piston rod for passing out fluid power in the cylinder barrel (rod housing), and fluid medium conveying systems need an operating stem for controlling the flow of fluids through the valve body (stem housing). This moving rod or stem needs a seal between it and its housing. A seal whose tightness is caused by an installed stress is called a pressure-tight seal, and a seal whose tightness is caused by a fluid pressure is called a self-energizing seal. The material as an indispensable pressure-tight cylinder-sealing ring between that moving rod or stem and its housing shall at least be soft and wear-resistant, and have a cross-sectional shape beneficial to the converting of its original axial tightening force into its radial sealing force, or any pressure-tight soft ring seal for moving rod or shaft cylinders shall at least have an ability to effectively orthogonally transmit an installed stress. However, it is well known that objects that can effectively orthogonally transmit a stress can only be either a rigid body with wedging function or a closed liquid without extrusion gap.

From the material's sealing mechanism proposed by the inventor (see ZL201210070823.2), it can be seen that:

- the ability for a liquid to transmit a pressure in time equally in each direction originates from its softness and its volume incompressibility—its softness can cause it to have a deforming and flowing power on being compressed, and its volume incompressibility can cause it to have an identical deforming and flowing power in each direction;
- it can be seen from bulk modulus $K=E/[3(1-2\mu)]$ that an object whose Poisson's ratio $\mu$ is closer to 0.5 has a volume incompressibility closer to infinity;
- the Poisson's ratio of a general object under normal temperature is greater than 0 and smaller than 0.5, but will be close to 0.5 when its homologous temperature, which is the ratio of its absolute temperature to its melting absolute temperature, is higher than 0.5, and the closer to 1 (the melting point) its homologous temperature, the closer to 0.5 its Poisson's ratio, and vice versa; thus
- it can be said that the Poisson's ratio $\mu$ is an index of liquid behavior and incompressibility of a general object; or a general solid object under normal temperature has both a solid property and a liquid property, and the closer to 0.5 its Poisson's ratio, the fuller its liquid behavior; therefore,
- any pliable material that has a Poisson's ratio close to 0.5, such as rubber, PTFE, lead, gold etc., can be simply used for sealing rings that need to orthogonally transmit a pressure or stress under normal temperature;
- since material's Poisson's ratio $\mu$ is the ratio of its strain in the non-compressed transverse direction to its strain in the compressed longitudinal direction, any pliable material whose Poisson's ratio is smaller than 0.5 can be used for a sealing ring needing to orthogonally transmit a pressure or stress under normal temperature by compensating for its orthogonal strain ratio to 0.5 by a Poisson's deformation compensation angle—actually, the Poisson's deformation compensation angle is enabling a general compressible sealing ring to be compressed from a great room to a small room to cause it to have an additional deformation increment in the non-compressed direction perpendicular to the compressing force.
- not only the angle Arctan(h/d), where h=the height of sealing rings and d=the internal diameter of sealing rings, used to compensate for Poisson's deformation of sealing rings from 0 to 0.5 or from 0.5 to 0 is very small, but also what the angle changes is only the response time for the ring material to reach its Poisson's ratio limit 0.5 or 0 but never the magnitude of the two limits, or at most eliminates the lagging of its orthogonal deformation ratio behind its final value, and thus any ring-containing cavity is eligible as long as it has an angle not smaller than the angle Arctan(h/d) and can cause the ring therein to be compressed from a great room to a small room; and
- the Poisson's ratio of a general material not only changes with its temperature and loading pressure but also lags behind its loading pressure, and so any material even with a Poisson's ratio of 0.5 under atmospheric temperature and pressure also needs a Poisson's deformation compensation angle to enable its sealing ring to orthogonally transmit a pressure or stress at any working pressure and temperature within ratings in time effectively.

Therefore, as shown in FIGS. 1 to 3, it is only a triangular soft sealing ring that can utilize the wedging function of its hard gland to amplify its original axial tightening force into another force causing the whole soft ring to be compressed from a great room to a small room on its sealed stem to provide a radial sealing compression stress for the stem in time and effectively.

From the sealing theory proposed by the inventor (see ZL201210070823.2), it can be seen that:

- A fully leak-free connection state results from a full deformation complementary to irregularities of sealed surfaces that is produced and maintained by a sealing surface compressed on the sealed surface, and hence a softer and inelastic sealing surface more easily produces a full sealing deformation under compression, and a stronger and elastic sealing surface support more easily provides a full deforming and maintaining power for the sealing surface under compression; or the difficulty for a sealing element to achieve or maintain its fully tight contact state is determined by the ratio, called the sealing difficulty factor m1, of the effective elastic modulus Ec of its sealing surface to the effective elastic modulus Es of its body, and $m_{1_{max}}=Ec/Es=1$;
- an O-ring of infinitely thin wall metallic tubing fully filled with liquid can be used to simulate solid soft O-rings, where the metallic tubing represents their fixed shape, the liquid represents their liquid property, and it is very obvious that the closer to 0.5 their Poisson's ratio, the thinner the wall thickness of their simulating ring of metallic tubing for the same soft rings made of the same material and vise versa, so that:
  - first from the fact that the simulating ring of metallic tubing and the simulated soft ring have the same circumferential tensile strength, it can be seen that
$2\pi r_u \delta_k R_{mk} = \pi r_u^2 R_{mr} \to 2\pi r_u k r_u R_{mk} = \pi r_u^2 R_{mr} \to k R_{mk} = 0.5 R_{mr}$
and then from the equation "$p_m = R_m \delta / r$" for the pressure that a common metallic thin wall tubing can withstand, it can be seen that the equation "$p_m r = R_{mk} \delta_k \equiv$ constant" is tenable to a ring of metallic tubing for simulating identical solid soft rings at any extrusion arc radius r, and further that the equation $p_{mr} r_e = p_u r_u = (R_{mk} \delta_k / r_u) r_u = R_{mk} k r_u = 0.5 R_{mr} r_u$ is tenable to any soft ring or the maximum pressure that any soft ring in its cavity can withstand is $p_{mr} = p_u r_u / r_e = 0.5 R_{mr} r_u / r_e$, where $p_u = 0.5 R_{mr}$=the maximum pressure that the simulating O-ring of metallic tubing can withstand before installed into its cavity, $r_u$=the cross-sectional radius of the soft O-ring and its simulating O-ring of metallic tubing before installed into its cavity, $r_e$=the maximum extrusion arc radius of the soft O-ring in its cavity, $\delta_k = k r_u$=the wall thickness of the simulating O-ring of metallic tubing, $R_{mk}$=the material's strength of the simulating O-ring of metallic tubing, $R_{mr}$=the material's strength of the soft O-ring, $R_m$=the material's strength of a common metallic thin wall tubing, $\delta$=the wall thickness of a common metallic thin wall tubing, r=the cross-sectional radius of a common metallic thin wall tubing; and any self-energizing seal at its maximum allowable working pressure has a compressive stress or a sealing stress equal to its maximum allowable working pressure, and so the maximum compressive stress provided for the sealing surface by any soft sealing ring that can effectively orthogonally transmit a pressure or stress is mainly not determined by material's strength and wall thickness of the soft ring but by its maximum extrusion arc radius $r_e$ in the cavity, for example, the maximum allowable working pressure of a rubber O-ring, or the maximum compressive stress that a rubber O-ring can provide for its sealing surface, is infinite when its extrusion gap or its extrusion arc radius is zero in the cavity.

Therefore, a pressure-tight sealing ring whose material is softer and inelastic and whose cavity has a smaller extrusion gap or is more closed can more cause its sealing surface to have a full sealing deformation and support when it is compressed in its cavity, which is entirely beyond the general traditional design concept of meeting the requirement of service pressure by computing and designing material's strength and wall thickness of sealing rings.

In clauses UG-101(a) (1) and (2) of ASME BPVC Section VIII Division 1 Rules for Construction of Pressure Vessels, it is explicitly stipulated that any vessel or vessel part whose strength and thickness cannot be accurately computed in accordance with its maximum allowable working pressure shall pass either a proof test based on yield limit of its material or a burst test based on burst limit of its material.

There is no seal that can be designed and computed before ZL201210070823.2, and by rights any seal shall be more required to pass, with its vessel, either a proof test with its test pressure at least equal to 1.5 or 2 times its maximum allowable working pressure or a burst test with its test pressure at least equal to 4 times its maximum allowable working pressure. However, the relevant standards, such as ISO 5208, ASME B16.34 etc., only require a seal to pass a test without visually detectable leakage at 1.1 times its maximum allowable working pressure, thus causing the safety of global pressure vessels and systems to be governed by their seal.

In ZL201210070823.2, the inventor only resolves the design and computation of rectangular and O-shaped ring seals, which cannot be used as pressure-tight seals for a moving rod, in accordance with their maximum allowable working pressure. In ZL200510097905.6 and ZL200810172830.7, the inventor only proposes that the cross-sectional shape of pressure-tight stem seals shall be an equilateral triangle, but does not resolve their design and computation in accordance with their maximum allowable working pressure.

SUMMARY OF THE INVENTION

The purpose of the invention is to propose computing and designing equilaterally triangular ring seals for a moving rod or shaft in accordance with their maximum allowable working pressure, and, with ZL201210070823.2 that has proposed computing and designing rectangular and O-shaped ring seals in accordance with their maximum allowable working pressure, to thoroughly end the era when no seal can be designed and computed.

From the fact that a soft O-ring in its cavity at its maximum allowable working pressure has a compressive stress equal to its maximum allowable working pressure $p_{mr} = 0.5 R_{mr} r_u / r_e$, it can be seen that a soft O-ring just has a compressive stress equal to its material's strength $R_{mr}$ when it is compressed in its cavity by 50% squeezes or to $r_u / r_e = 2$. Hence, further from the Parker's famous test result that grease coatings on a rubber O-ring can reduce its leakage when it is at squeezes less than 50%, but cannot reduce its leakage when it is at a squeeze equal to 50%, it can be inferred that the initial sealing stress $S_i = r_r + 0.2$) MPa required by a seal at atmospheric temperature and pressure, where $R_{mr}$=the material's tensile strength of sealing surfaces=the stress needed to work or install a semi-finished sealing surface into a qualified finished sealing surface with no tensile resistance in position, 0.2=the minimum necessary sealing stress needed to make a qualified sealing surface achieve and maintain its fully tight contact at atmospheric temperature and pressure, one 0.1 of 0.2=the stress needed to squeeze a qualified sealing surface into leaking micropits and microgrooves and extrude all air therein at atmospheric temperature and pressure, and the other 0.1=the stress needed to cause a sealing surface in leaking micropits and microgrooves to reach its full tight contact that can resist the atmospheric seepage.

As for the soft O-ring that can move from a great room to a small room in its cavity on being compressed, when it is fully compressed, its material not squeezed into its extrusion corner will be what is fully restrained from producing any Poisson's deformation or fully constrainedly compressed and has a Poisson's ratio closer to 0.5, whereas its material squeezed into its extrusion corner will be what is only stretched and has a Poisson's ratio closer to 0, so that it can be seen from constrained modulus:

$$M = [E(1-\mu)] / [(1+\mu)(1-2\mu)]$$

=∞ (when Poisson's ratio $\mu = 0.5$), or

=E (when Poisson's ratio $\mu = 0.0$)

that any soft O-ring under fully constrained compression, even when its compressed stress far exceeds its material's strength ($R_{mr}$), is still intact, or the maximum allowable working pressure ($p_{mr}$) of a soft O-ring under fully constrained compression, as set forth in Technical Background, is determined by the maximum tensile resistance in its extrusion corner, or $p_{mr}=0.5R_{mr}r_u/r_e$.

Because a solid triangular soft ring and its all parts in and out of its incircle are so compressed from a great room to a small room in its cavity as to enable the raising pressure within the simulating O-ring of metallic thin wall tubing of its incircle ring to be transmitted exactly and equally to each direction by three corners, the maximum allowable working pressure of the triangular soft ring ($p_{mr}$) equals the maximum pressure $p_{mr}$, $p_{mr}=0.5R_{mr}r_u/r_e$, that the simulating O-ring of metallic thin wall tubing of its incircle ring can withstand in the cavity, where $R_{mr}$=the material's strength of the triangular soft ring, $r_u$=the incircle radius of the triangular soft ring, and $r_e$=the maximum extrusion arc radius of the triangular soft ring in its cavity.

The above is the new seal-designing concept derived by the inventor for the invention. For its details, see the forthcoming paper "Any Seal under Pressure Shall Have a Poisson's Deformability of 0.5 Ratios".

As shown in FIGS. 1 to 3, a triangular soft ring 04 for stem cylinder seals needs an open cavity formed by cutting off its off-stem corner to enable a hard gland 03a over the soft ring to slide along the stem and do the full compression of the soft ring. The extrusion gap or extrusion arc radius of the soft ring 04 at its two non-off-stem corners can reduce to zero by the hard gland 03a and an anti-extrusion ring 05b, and so the maximum allowable working pressure of the triangular soft ring is mainly determined by the opening of the cavity at its off-stem corner. Therefore, the invention specially proposes an equilaterally triangular ring seal for moving rod or shaft cylinders (or called stem cylinder seals with triangular rings), including a single turn anti-extrusion ring 05b, a triangular soft ring 04 truncated at its off-stem corner and a hard metallic gland 03a that are successively fitted over the cylindrical stem or shaft 02 and, as the triangular soft ring is compressed on the stem cylinder and in a 120° conical seat of stem housings 01 at the same time by a 120° inner conical surface of the hard metallic gland, form a triangular ring-containing cavity consisting of the inner conical surface of the hard metallic gland, the stem cylinder and the conical surface of the seat and having an opening caused by cutting off the cavity's off-stem corner to enable the triangular soft ring therein to be fully compressed, wherein the single turn anti-extrusion ring made of either a bent turn of soft metallic wire with enough length and cross-sectional diameter or a molded turn of nonmetallic material with enough strength is used to resist the extrusion of the triangular soft ring through the gap between the stem and the stem housing, a sliding fit with a small enough clearance is used to resist the extrusion of the triangular soft ring through the gap between the gland and the stem, and an arc-shaped anti-extrusion metallic C-ring 05a attached to the truncated corner of the triangular soft ring is used to resist the extrusion of the triangular soft ring through the opening of the cavity.

Without a full uniform circumferential compression of sealing surfaces, there is no fully pressure-tight joint. Hence, in order to ensure that the triangular soft ring 04 for Non-rising stem cylinder has a uniform circumferential compression of its seat and stem 02 at all times (see FIG. 3), any stem shoulder seal matching the stem cylinder seal shall be a spherical and conical or spherical and spherical mating pair to ensure that the symmetry of the stem cylinder ring 04 in its seat is not affected by the being into position of the stem shoulder seal. Therefore, the invention specially proposes an equilaterally triangular ring seal for moving rod or shaft shoulders (or called stem shoulder seals with triangular rings) matching the stem cylinder seal, including a triangular soft ring 06 truncated at its off-stem corner and a hard metallic gland 07 that are fitted together over the spherical stem shoulder 02 by their 60° 120° conical surfaces and, as the triangular soft ring is compressed on the stem housing 01 by the spherical stem shoulder and the hard metallic gland, form a triangular ring-containing cavity consisting of the inner conical surface of the hard metallic gland, the spherical surface of the stem shoulder and the flat surface of the stem housing and having an opening caused by cutting off the cavity's off-stem corner to enable the triangular soft ring therein to be fully compressed, wherein a contact fit without clearance between the stem shoulder and the stem housing as well as the hard metallic gland is used to resist the extrusion of the triangular soft ring at two non-truncated corners, and an arc-shaped anti-extrusion metallic C-ring 05a attached to the truncated corner of the triangular soft ring is used to resist the extrusion of the triangular soft ring through the opening of the cavity.

Because any triangular soft ring used as either stem cylinder seals or stem shoulder seals has a non-sealing surface, an inverse-J-shaped (see FIG. 4) or J-shaped (see FIG. 5) ring, a variant anti-extrusion C-ring formed by extending the C-shape only along the non-sealing surface of the triangular soft ring and keeping the arc of the C-shape not changed, can be substituted for anti-extrusion C-rings used as either stem cylinder seals or stem shoulder seals in order to facilitate the handling of the triangular soft ring.

Because the maximum pressure that a triangular soft ring seal without anti-extrusion C-shaped, inverse-J-shaped or J-shaped rings can withstand is an offsetting pressure against the extrusion pressure exported from the simulating ring of thin wall tubing of the triangular soft ring and acting on the anti-extrusion ring, the maximum allowable working pressure $p_m$ of a triangular soft ring with an anti-extrusion metallic ring is the sum of the maximum pressure $0.5R_{mr}r_u/r$ that the soft ring without the anti-extrusion ring can withstand in the cavity and the maximum pressure $R_m\delta/r$ that the anti-extrusion ring can withstand, or $p_m=0.5R_{mr}r_u/r+R_m\delta/r$, where $R_{mr}$=the material's strength of the triangular soft ring, $R_m$=the material's strength of the anti-extrusion metallic ring, $\delta$=the wall thickness of the anti-extrusion metallic ring, r=the extrusion arc radius of the triangular soft ring=the arc radius of the anti-extrusion metallic ring, and $r_u$=the incircle radius of the fundamental equilateral triangle.

From the above, it can be seen that the invention's purpose of computing and designing equilaterally triangular ring seals for a moving rod or shaft in accordance with their maximum allowable working pressure is achieved by regarding the two parts inside and outside the incircle ring of their triangular soft sealing ring as the two parts respective for determining and transmitting of their maximum withstandable pressure under compression. Because O-shaped, rectangular and triangular ring seals can meet the requirements of all the ring seals, the invention with ZL201210070823.2 can thoroughly end the era when no seal can be designed and computed.

Like an anti-extrusion metallic C-ring, either anti-extrusion metallic coiled rings (shown in FIG. 6) or anti-extrusion close wound coil spring rings (shown in FIG. 7) substituted for the metallic C-ring whose arc circle is roughly the same as their cross-sectional outline circle can also cause the maximum withstandable pressure and the sealability of triangular soft rings to increase at the same time. When the anti-extrusion metallic coiled ring is compressed by its gland, as shown in FIG. 6b, the inner and outer wires respectively at the two sides of the two intersected conical surface of soft-ring-compressing resultant forces F will respectively uniformly inward and outward bulge. The uniformly outward bulged and tensioned outer wires can be simulated with a thick-wall circular-arc C-ring, where the wall's cross-sectional area of the simulating C-ring represents the total cross-sectional area of coiled wires and the cavity area within the simulating C-ring represents the void area between coiled wires. The inward bulging and random buckling of inner wires (see the right of FIG. 6b) will be bound to result in a segment allowing the soft material 04 or 06 to penetrate therein (see the right of FIG. 6c). If k is the ratio of the total cross-sectional area of coiled wires to the cross-sectional area of coiled wire ring outline, it can be seen from FIG. 6c that: $\pi r_o^2 k = \pi (r_o - r_i)^2 \rightarrow r_o \sqrt{k} = r_o - r_i \rightarrow r_i = (1 - \sqrt{k}) r_o$, and it can be seen from the withstandable pressure formula for thick wall tubing that an anti-extrusion metallic coiled ring can withstand a maximum pressure $p_m = R_m \ln(r_o/r_i) = R_m \ln[1/(1-k)]$, where $r_o$=the cross-sectional radius of coiled ring outline≈the outer wall radius of simulating C-rings, $r_i$=the inner wall radius of simulating C-rings, $R_m$=the tensile strength of wire material and k≈0.75.

Human practice has verified that a triangular soft sealing ring with solid powder or fiber fillers, such as a triangular PTFE sealing ring with carbon powder or glass fiber fillers, often has such an enhanced hardness or compressive strength and such an enhanced deforming resistance or an enhanced extrusion resistance under compression as not to need any anti-extrusion metallic ring in high pressure services, but has such an enhanced yield strength as to have a higher sealing difficulty factor and cause a low pressure seal to need a high pressure tightening design; or the enhanced extrusive resistance or withstandable maximum pressure that fillers cause a triangular soft sealing ring to have is at expense of ring's sealability.

Because any design causing anti-extrusion metallic (C-shaped, inverse-J-shaped, J-shaped or coiled) rings to have an enhanced extrusion resistance cannot markedly cause their cross-section to have an increased bending strength but can markedly cause their triangular soft ring under compression to be better closed or supported, after designed to have an enhanced extrusion resistance they can give their triangular soft ring such a higher pressure-withstanding limit and such a lower sealing difficulty factor at the same time that a triangular soft ring with anti-extrusion metallic or coiled ring for high pressure service can be used in low pressure service and only requires a tightening design for low pressure service. Therefore, the technical solution that an anti-extrusion metallic or coiled ring is attached to a triangular soft ring is far more ideal than the technical solution that fillers are added in a triangular soft ring.

Obviously, various anti-extrusion metallic rings 05a attached to the truncated corner of triangular soft rings can be made of high strength plastic, but cannot be such a solid ring made of high strength plastic as to affect the full axial compression of triangular soft rings.

In a word, the stem-seal designing rules disclosed and obeyed in the invention are first, by means of wedging function of a hard gland coaxial with the stem cylinder, to convert the seal's original axial tightening force 2f respectively into a radial compression force (4f/√3) of the soft ring 04 on the cylindrical stem 02 and another radial compression force 2f of the soft ring 06 on the spherical stem shoulder 02 and ensure that the two soft rings are so compressed from a great room to a small room as to be able to pass a pressure or stress exactly to each different direction, then to cut off the off-stem corners of the two seals to give their cavities an opening or give their soft rings an axial compressing allowance, and last, by means of anti-extrusion rings without axial resistance, such as metallic C-rings, to close each opening to provide a full support for the sealing deformation of the soft rings compressed in their cavities.

BRIEF DESCRIPTION OF DRAWINGS

In FIGS. 1 to 6 showing the triangular ring seals of the invention, 01 is valve bodies or bonnets collectively called stem housings; 02, stems; 03a, hard metallic glands of soft sealing rings for stem cylinders; 03b, bonnets of glands for stem cylinders; 04, soft sealing rings for stem cylinders; 05a, anti-extrusion metallic rings attached to the truncated corner of soft sealing rings; 05b, single turn anti-extrusion rings between stems and their housings; 06, soft sealing rings for stem shoulders; 07, hard metallic glands of soft sealing rings for stem shoulders; 08a, spherical washers; 08b, Belleville washers; 08c, hexagonal screws; 09, hexagonal nuts; 10, valve handles; 11, valve locks; and 12, spaced tying turns for anti-extrusion metallic coiled rings.

FIG. 1 shows a small size of rising stem cylinder seals for valves, where FIG. 1b is the partial enlarged view of the stem cylinder seal in FIG. 1a.

FIG. 2 shows a large size of rising stem cylinder seals for valves, where FIG. 2b is the partial enlarged view of the stem cylinder seal in FIG. 2a.

FIG. 3 shows non-rising stem cylinder and shoulder seals for ball valves, where FIG. 3b is the partial enlarged view of the stem shoulder seal in FIG. 3a. The partial enlarged view of the stem cylinder seal in FIG. 3a is as shown in FIG. 2b.

FIGS. 6b and 6c are respectively the real cross-sectional view and its simulating cross-sectional view of FIG. 6a-shown anti-extrusion metallic coiled rings substituted for anti-extrusion metallic C-shaped, inverse-J-shaped or J-shaped rings.

FIG. 7 shows anti-extrusion close wound coil spring rings substituted for anti-extrusion metallic C-shaped, inverse-J-shaped or J-shaped rings.

DETAILED DESCRIPTION OF THE INVENTION

Figure 1B:
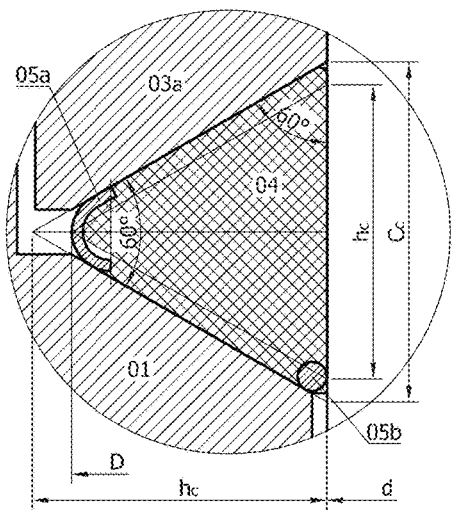
Figure 1A:
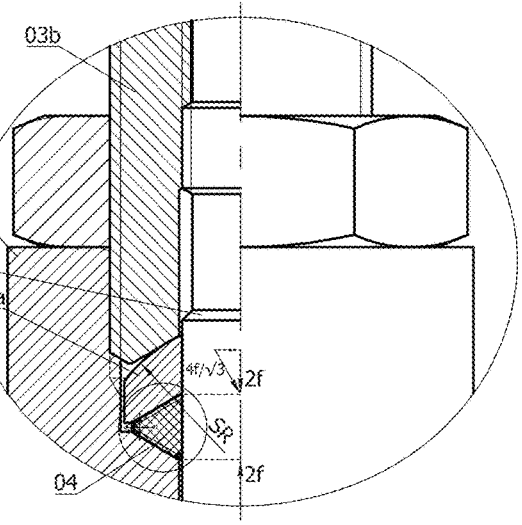
Figure 2B:
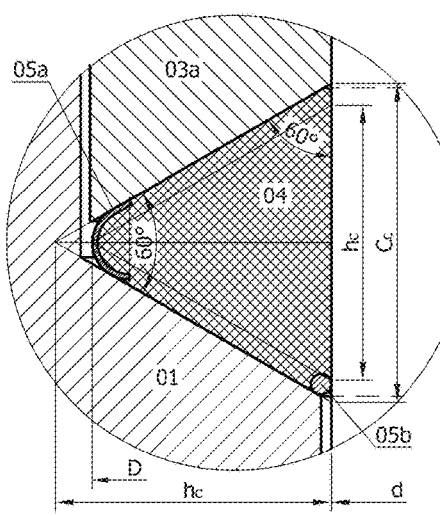
Figure 2A:
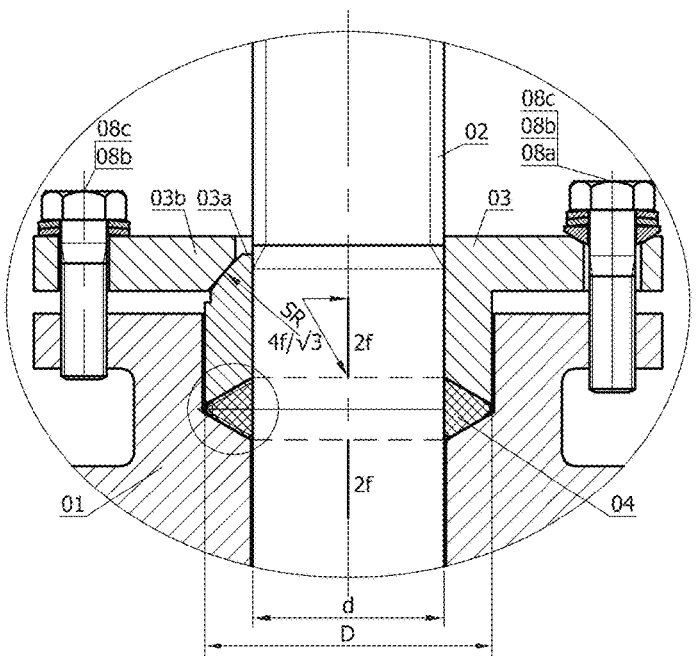

As shown in FIGS. 1-3, the final orientation of a valve stem 02 is determined by the installing of its cylinder-sealing soft-ring 04 into a 120° conical seat of its housing 01. Hence, in order to ensure that a hard gland 03a can cause the soft ring 04 to have a uniform circumferential compression in its conical seat and on the stem 02, it shall be required first that three basic surfaces of the soft ring are coaxial, second that the inner conical surface of the hard gland is always coaxial with the stem during installation, third that there is an enough gap between the gland and the stem housing to ensure that the gland and the stem can swing with the soft ring during installation, and then that the soft ring is loaded by the mating of conical and spherical surfaces, for example, the soft ring in FIG. 1 shall be loaded by the mating of the bonnet's (03*b*'s) inner conical surface coaxial with its fastening threads and the gland's (03*a*'s) outer spherical surface coaxial with its inner conical surface, the soft ring in FIG. 2 shall be loaded either by the mating of the clamp's (03*b*'s) inner conical surface and the gland's (03*a*'s) outer spherical surface coaxial with its inner conical surface or by the mating of the spherical washer's (08*a*'s) outer spherical surface and the conical port of the screw's through-holes, and the soft ring in FIG. 3 shall be loaded by the mating of the Belleville washer's (08*b*'s) outer spherical surface and the relevant chamfered port, in order to ensure that gland's loading resultant force coincides with the stem axis.

Figure 5A:
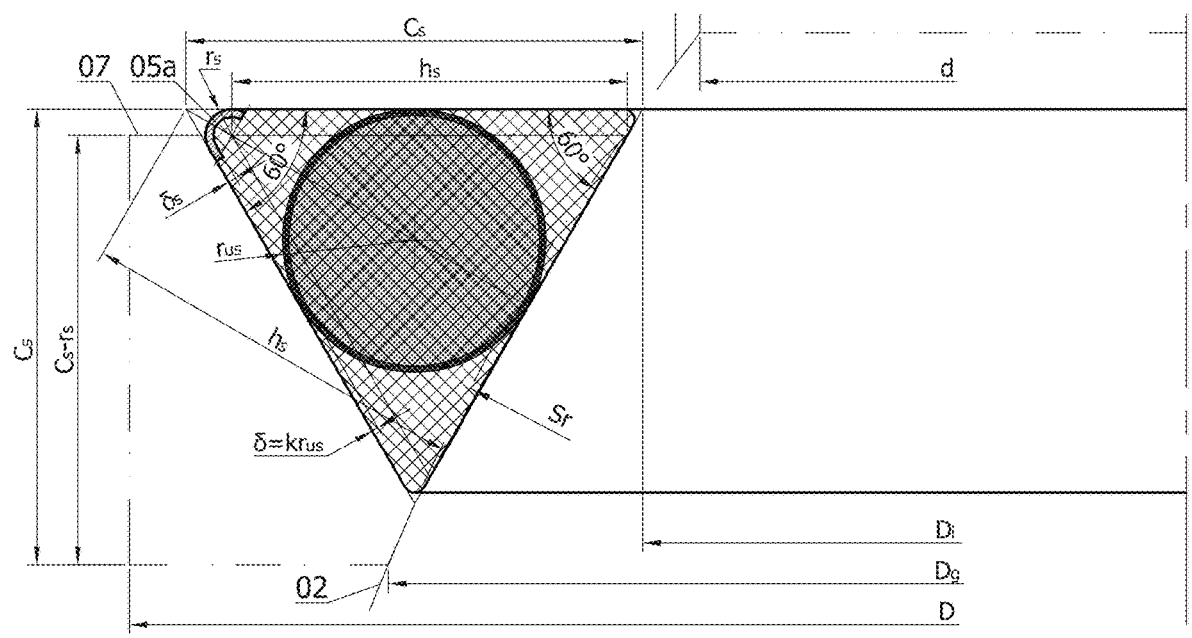
FIGS. 5a and 5b show triangular soft rings for stem shoulder seals respectively with an anti-extrusion metallic C-ring and an anti-extrusion metallic J-ring, where the circular ring with thickness $\delta = kr_{us}$ is the wall's cross-section of the simulating O-ring of metallic thin wall tubing of incircle rings of the triangular soft ring.
Figure 5B:
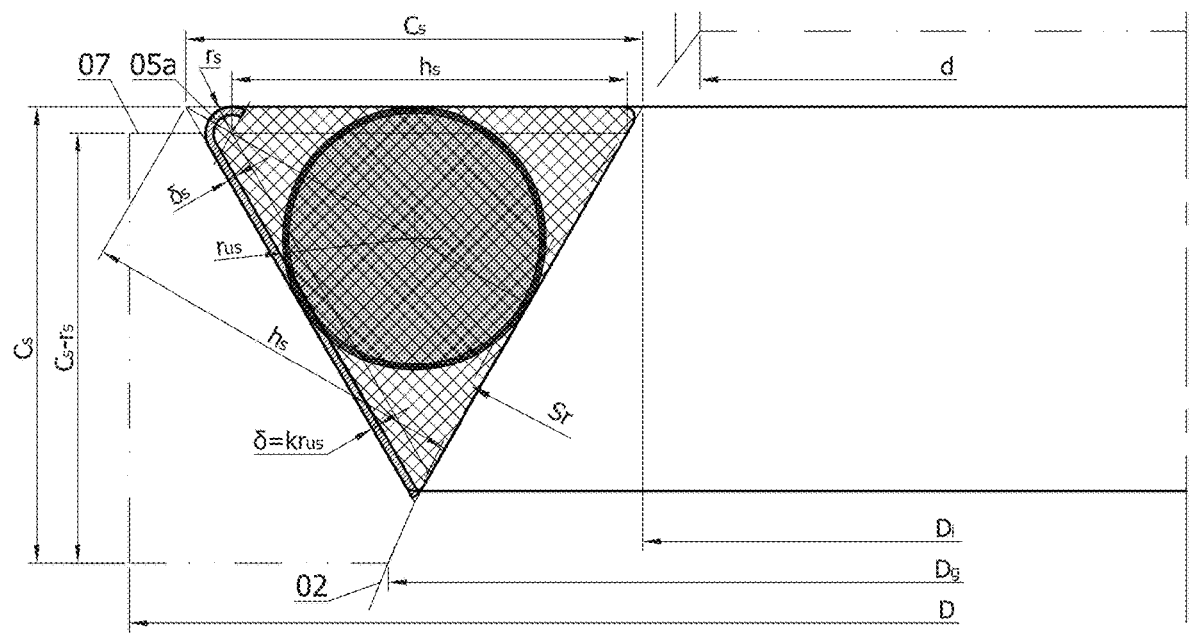

In order to ensure that non-rising stems have a stem shoulder seal (see FIG. 3) formed by a spherical and spherical mating pair and coaxial with its stem cylinder seal and thus ensure that both of the two seals have a fully uniform circumferential compression of their soft rings at the same time, first have the spherical sealing surface Sr of shoulder sealing soft rings 06 pre-made into a conical surface coaxial with the other basic surfaces (see FIG. 5), have the stem or the spherical stem shoulder case-hardened and prepare a metallic ring whose dimensions are the same as the cylinder sealing soft ring 04; then, by substituting the metallic ring for soft rings 04, make a heavy installation of the shoulder seal in position to work the pre-made conical surface of soft rings 06 and the housing surface between diameters d and Di (see FIG. 3*b*) into a spherical surface coinciding with the case-hardened spherical stem shoulder; and last finish the formal installing of the stem by substituting the soft ring 04 for the metallic ring. When the installing causes its shoulder to touch its housing, the installed metallic touch can eliminate both the infinite loading of the stem shoulder seal by tightening force for installation and the unloading of the stem cylinder seal by fluid pressure on the stem end, and also can result in the fluid pressure on the end of gland 07 causing not only an enhanced stem shoulder seal but also such a weakened stem-ejecting-out power as to cause an effect of both lowering the friction between the stem shoulder and the stem housing and enhancing the stem cylinder seal, and thus the spherical and spherical metallic mating pair between the stem shoulder seal and the stem cylinder seal can be called an isolating mating pair therebetween. Because the installing torque will soar when the installing of a stem causes its shoulder to touch its housing, the extent to which the stem is installed can be controlled by feeling. If a stem is installed only to cause its shoulder to just touch its housing, the installing will only cause its shoulder seal as an energizing seal but not its cylinder seal as a pressure-tight seal to function, and so it may not be needed to consider retightening to cause the cylinder seal to function until both the shoulder ring seal and the isolating mating pair as self-energized seals fail, which can avoid shutting down the system beyond the plan. The compressing forces on each surface of the shoulder sealing ring and the cylinder sealing ring are respectively $2f$ and $4f/\sqrt{3}=2.31f$ before the isolating mating pair is installed to its tight contact, and hence, if it is desired to make the cylinder sealing ring and the shoulder sealing ring have the same sealing stress at this time, the lengths Cs and Cc of fundamental triangle sides of the shoulder sealing ring and the cylinder sealing ring shall be designed roughly in accordance with $Cs=0.5\sqrt{3}Cc=0.87Cc$. However, if it is desired only to cause the shoulder sealing ring and the isolating mating pair but not the cylinder sealing ring to function, it is recommended that the shoulder ring and the cylinder ring are designed in accordance with $Cs<0.5\sqrt{3}Cc=0.87Cc$.

Similarly, a backseat seal matching a stem cylinder seal for rising stems shall be designed and installed the same as the above stem shoulder seal to make the backseat seal be formed by a spherical and spherical mating pair and coaxial with the stem cylinder seal, ensuring that the backseat seal and the cylinder seal can function at the same time when a valve is fully turned on.

In order to ensure that the compressing stress of sealing soft rings is not affected by their abrasion and thermal expansion, they shall be fully compressed by live loads from elastic deformation of Belleville washers 08*b*, glands 03*a* and/or anti-extrusion rings 05*a* properly designed and installed. Because the maximum allowable working pressure and the providable maximum compressing stress of a triangular soft ring are mainly determined by extrusion resistance of its anti-extrusion ring but not by strength of its material, a size of triangular soft rings can be designed and provided by using the softest ring to meet the requirement of maximum possible working pressure of the size of triangular soft rings, or, except for material, there can be no dimensional difference between all the triangular soft rings for a size whose maximum possible working pressure does not exceed their maximum allowable working pressure. The triangular soft rings for general purposes are made of either pure polytetrafluoroethylene (PTFE) or flexible graphite and, for a particular purpose, made of lead or gold. In order to save raw materials and constructing spaces, their tightening structures shall be designed in accordance with their actual maximum allowable working pressures.

Figure 4A:
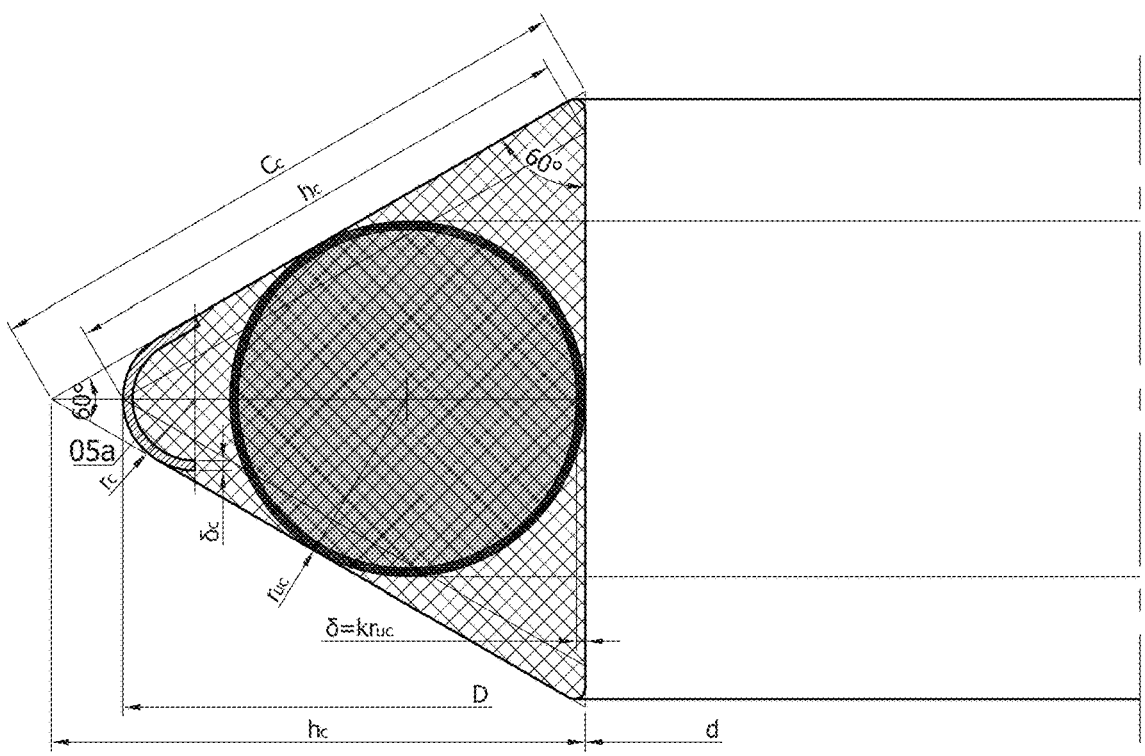
FIGS. 4a and 4b show triangular soft rings for stem cylinder seals respectively with an anti-extrusion metallic C-ring and an anti-extrusion metallic inverse-J-ring, where the circular ring with thickness $\delta = kr_{uc}$ is the wall's cross-section of the simulating O-ring of metallic thin wall tubing of incircle rings of the triangular soft ring.
Figure 4B:
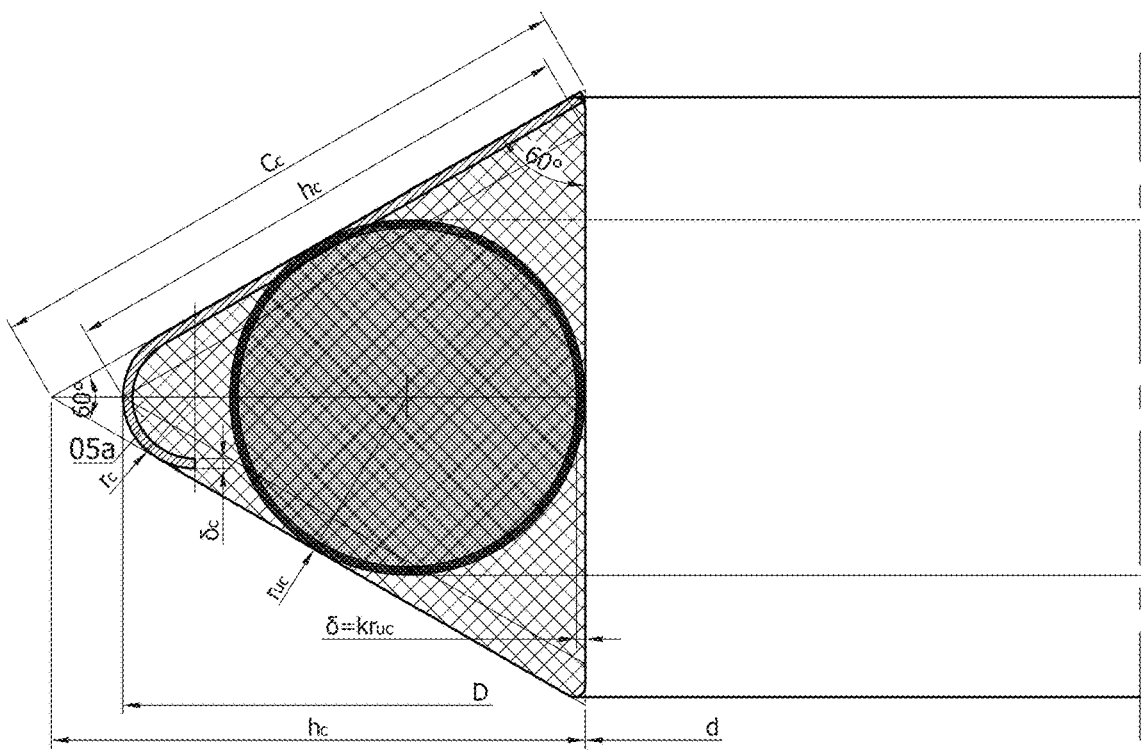

An equilaterally triangular pressure-tight stem-sealing ring has three basic surfaces that have three equal action forces and three different areas and are respectively used as its dynamic sealing surface, static sealing surface and loading surface. To make the dynamic sealing surface have a sealing stress greater than that of the static sealing surface and provide a dynamic sealing deformation for moving stems in time, the dynamic sealing surface must achieve both supports from the static sealing surface and the loading surface stronger than the dynamic sealing surface at the same time, and hence the truncating of stem-sealing rings at their off-stem corner shall not be so much as to cause either of non-dynamic sealing surfaces to have an area smaller than that of the dynamic sealing surface. For this purpose, the fundamental triangle for stem cylinder seals shall be the equilateral triangle whose altitude hc is the side length of another equilateral triangle whose altitude is the height of the truncated arc top (see FIG. 4), and the fundamental triangle for stem shoulder seals shall be the equilateral triangle whose altitude hs is the side length of another equilateral triangle whose altitude is the center height of the truncated arc (see FIG. 5). To make the isolating mating pair a self-energized seal just installed to its tight contact, it is recommended that the shoulder seal is designed in accordance with its fundamental triangle side length $Cs=0.6Cc$. Therefore, the fundamental triangle side length $Cc=2hc/\sqrt{3}=2(D-d)/3$ for stem cylinder seals and the fundamental triangle side length $Cs=2hs/\sqrt{3}=0.6Cc=0.4(D-d)$ for stem shoulder seals, where $0.5(D-d)$=the height of the off-stem round corner top of stem cylinder seals or the wall thickness of sealing rings for stem cylinders, $hc=(D-d)/\sqrt{3}$ and $hs=\sqrt{3}Cs/2=0.2\sqrt{3}(D-d)$.

The extrusive deformation of an anti-extrusion ring without enough extrusive resistance will cause its extrusion arc radius to decrease and its extrusion resistance to triangular soft rings to increase, and so it is unnecessary to care too much about the manufactured deviation that causes the anti-extrusion ring to have a decreased extrusion resistance. However, it is necessary to care particularly whether the extrusion gap at non-truncated corners in high pressure service is eliminated enough because the maximum allowable working pressure of triangular soft rings is determined in accordance with their extrusion resistance at the truncated corner.

It is the anti-extrusion metallic coiled ring just tied up to have a circular cross-sectional outline that can have no axial resistance but an enough radial extrusive resistance when compressed in position with its soft ring. Therefore, it shall be necessary to pay attention to the tying of anti-extrusion metallic coiled rings. An anti-extrusion metallic coiled ring can be tied up by its coiling wire in an either spiral coil or spaced turn (12) way (see FIG. 6a). The density of its tying coil or turns determines the circular coherence of its circumferential cross-sectional outline, and the tied power does its axial resistance to compression.

The anti-extrusion metallic coiled ring shown in FIG. 6 and the anti-extrusion close wound coil spring rings shown in FIG. 7 are the anti-extrusion metallic ring whose manufacture does not need any dedicated tool, but the former's maximum allowable working pressure is computable and the latter's, incomputable but determinable by tests.

The invention claimed is:

1. A triangular ring seal assembly for a moving cylindrical stem, comprising:
    an equilaterally triangular soft ring having first and second corners adjacent the moving cylindrical stem with a single turn anti-extrusion ring in one of the first and second corners and a third off-stem corner away from the stem that is truncated and has an arc-shaped anti-extrusion metallic C-ring or metallic inverse-J-shaped ring with an arc-shaped hook attached,
    a hard metallic gland,
    the triangular soft ring and gland are successively fitted over the moving cylindrical stem and, as the seal assembly is compressed on the moving cylindrical stem and in a 120° conical seat of a stem housing and at the same time by a 120° inner conical surface of the hard metallic gland, form a triangular ring-containing cavity consisting of the inner conical surface of the hard metallic gland, the moving cylindrical stem and the conical surface of the seat and having an opening caused by cutting off the cavity's off-stem corner to enable the triangular soft ring therein to be fully compressed,
    the single turn anti-extrusion ring is made of either a bent turn of soft metallic wire with enough length and cross-sectional diameter or a molded turn of nonmetallic material with enough strength is used to resist the extrusion of the triangular soft ring through the gap between the stem and the stem housing, a sliding fit with a small enough clearance is used to resist the extrusion of the triangular soft ring through the gap between the gland and the stem, and
    the arc-shaped anti-extrusion metallic C-ring attached to the truncated corner of the triangular soft ring is used to resist the extrusion of the equilaterally triangular soft ring through the opening of the cavity.

2. The triangular ring seal assembly of claim 1, wherein the inverse-J-shaped ring is a variant C-ring formed by extending the C of the C-ring only along the non-sealing surface of the triangular soft ring that the inverse-J-shaped ring has the same arc as the C-ring.

3. The triangular ring seal assembly of claim 1, wherein dimensions of the seal are designed and computed to meet the requirement of its maximum allowable working pressure $p_{mc}=0.5 R_{mr}r_{uc}/r_c+R_{mc}\delta_c/r_c$, where $0.5 R_{mr}r_{uc}/r_c$ is the maximum withstandable pressure of a triangular soft ring without the anti-extrusion metallic C-ring or inverse-J-shaped ring, $R_{mc}\delta_c/r_c$ is the maximum withstandable pressure of the anti-extrusion metallic C-ring or inverse-J-shaped ring, $R_{mr}$ is the material's tensile strength of the triangular soft ring, $R_{mc}$ is the material's tensile strength of the anti-extrusion metallic C-ring or inverse-J-shaped ring, $\delta_c$ is the wall thickness of the anti-extrusion metallic C-ring or inverse-J-shaped ring, $r_c$ is the arc radius of the anti-extrusion metallic C-ring or inverse-J-shaped ring, and $r_{uc}$ is the incircle radius of the fundamental equilateral triangle.

4. A triangular ring seal assembly for a moving cylindrical stem, comprising:
    an equilaterally triangular soft ring having first and second corners adjacent the moving cylindrical stem with a single turn anti-extrusion ring in one of the first and second corners and a third off-stem corner away from the stem that is truncated and has an anti-extrusion metallic coiled ring or anti-extrusion close wound coil spring ring attached,
    a hard metallic gland,
    the triangular soft ring and gland are successively fitted over the moving cylindrical stem and, as the seal assembly is compressed on the moving cylindrical stem and in a 120° conical seat of a stem housing and at the same time by a 120° inner conical surface of the hard metallic gland, form a triangular ring-containing cavity consisting of the inner conical surface of the hard metallic gland, the moving cylindrical stem and the conical surface of the seat and having an opening caused by cutting off the cavity's off-stem corner to enable the triangular soft ring therein to be fully compressed,
    the single turn anti-extrusion ring is made of either a bent turn of soft metallic wire with enough length and cross-sectional diameter or a molded turn of nonmetallic material with enough strength is used to resist the extrusion of the triangular soft ring through the gap between the stem and the stem housing, a sliding fit with a small enough clearance is used to resist the extrusion of the triangular soft ring through the gap between the gland and the stem, and
    the arc-shaped anti-extrusion metallic coiled ring or anti-extrusion close wound coil spring ring attached to the truncated corner of the triangular soft ring is used to resist the extrusion of the equilaterally triangular soft ring through the opening of the cavity.

5. The triangular ring seal assembly of claim 4, wherein the seal with its triangular soft ring having the anti-extrusion metallic coiled ring can withstand a maximum pressure pmc or $p_{mc}=0.5R_{mr}r_u/r+R_m\ln[1/(1-\sqrt{k})]$, where $0.5R_{mr}r_u/r$ is the maximum withstandable pressure of a triangular soft ring without the anti-extrusion ring, $R_m\ln[1/(1-\sqrt{k})]$ is the maximum withstandable pressure of the anti-extrusion metallic coiled ring, $R_{mr}$ is the material's tensile strength of the triangular soft ring, $R_m$ is the material's tensile strength of the anti-extrusion metallic coiled ring, $r_u$ is the incircle radius of the fundamental equilateral triangle, r is the cross-sectional outline radius of the metallic coiled ring and about equal to the extrusion arc radius of the triangular soft ring without the anti-extrusion ring at the opening of the cavity, and k is the ratio of total cross-sectional area of wires to cross-sectional-outline area of the anti-extrusion metallic coiled ring.

\* \* \* \* \*